United States Patent

Yamato

[15] 3,655,445
[45] Apr. 11, 1972

[54] METHOD FOR REMOVING SHELLFISHES AND CRUSTACEANS GREGARIOUSLY SETTLING ON RUBBER HOSES

[72] Inventor: Masaru Yamato, Tokyo, Japan
[73] Assignee: Idemitsu Kosan Co., Ltd., Tokyo, Japan
[22] Filed: July 30, 1969
[21] Appl. No.: 846,286

[30] Foreign Application Priority Data

Aug. 17, 1968 Japan..................................43/58256

[52] U.S. Cl. ................................134/42, 21/60.5 R, 119/4, 134/4, 134/6, 137/15, 138/110
[51] Int. Cl.........................................................B08b 7/00
[58] Field of Search.............134/4, 9, 42, 6; 21/60.5, 60.5 R; 119/156; 117/94, 6; 138/129, 110

[56] References Cited

UNITED STATES PATENTS

| | | | |
|---|---|---|---|
| 2,459,164 | 1/1949 | Holst | 117/6 UX |
| 3,033,724 | 5/1962 | Stokes | 138/129 UX |
| 3,321,924 | 5/1967 | Liddell | 138/110 X |
| 3,428,092 | 2/1969 | Skinner et al. | 138/110 |

FOREIGN PATENTS OR APPLICATIONS

| | | | |
|---|---|---|---|
| 102,375 | 12/1936 | Australia | 117/6 |
| 663,730 | 5/1963 | Canada | 138/129 |

*Primary Examiner*—Morris O. Wolk
*Assistant Examiner*—Barry S. Richman
*Attorney*—Fred C. Philpitt

[57] ABSTRACT

Maintaining the efficacy of rubber hoses that are used to transport oil from a ship to a shore facility by wrapping the rubber hoses, prior to immersion in sea water, with a strip that can thereafter be readily removed and replaced once it has accumulated an undesirable quantity of sea life.

1 Claim, No Drawings.

METHOD FOR REMOVING SHELLFISHES AND CRUSTACEANS GREGARIOUSLY SETTLING ON RUBBER HOSES

This invention relates to a method for removing shellfishes and crustaceans clustering on a rubber hose used in sea water, and more particularly it relates to a method for removing sea life growing gregariously on a rubber hose, which comprises wrapping a sea water-resistant strip sheet around the rubber hose before it is put in service and then taking off the strip sheet from the said rubber hose when shellfishes and crustaceans cling so thick on the surface of the said strip that it becomes almost impossible for the hose to bear the weight of the shellfishes and crustaceans.

Since the capacity of petroleum refineries has been greatly increased with the recent development of the petroleum industry, petroleum transportation is frequently carried out by means of large capacity oil tankers. In such a situation, it often happens that the large capacity oil tankers are difficult to bring alongside a wharf which is near the location of oil storage tanks, due to the depth of a harbor. In order to overcome such difficulty, the oil tankers must be anchored at a berth located offshore and must be connected by several rubber hoses to a mooring buoy floating at the berth, which is in turn connected to storage tanks on the shore through steel tubes laid on the sea bottom. Rubber hoses having an outside diameter as large as about 500 mm and a length as long as about 30 m are used, depending upon the circumstances. When such hoses are used for a long period of time under the sea surface, sea life, i.e., such shellfishes as mussels and such crustaceans as barnacles, settle gregariously on the hoses.

If a considerable amount of shellfishes and crustaceans settle on the hoses, the rubber hoses are deformed by the weight, and at the same time an abnormal stress is exerted on the said mooring buoy floating at the off-shore berth. Consequently, mooring wire ropes on the buoy are sometimes broken, or joints of the rubber hoses are damaged, resulting in wear and tear or rupture of the rubber hoses themselves. Furthermore, various troubles or disasters may thereafter be brought about at any moment.

Thus, rubber hoses in sea water must be frequently inspected, and when the clustering of the living things on the rubber hose is found to be too thick, the job of removing the sea life from the rubber hoses must be carried out by divers. This job is very difficult and requires much labor. Sometimes, the rubber surfaces are damaged by a scraping tool.

To solve this problem, attempts have been made to apply to the surface of the rubber hose various coating materials which seem to be disliked by sea life, but no satisfactory method has been found.

The present inventor has conceived the method of the present invention to these disadvantages.

According to the present invention, there is provided a method for removing sea life settling gregariously on a rubber hose, which comprises wrapping in advance, a sea water-resistant strip sheet around the rubber hose to be used in sea water and taking off the said strip sheet wrapping when the sea life clings so thickly to the strip sheet surface that the removal of them becomes necessary.

According to the present invention, the strip sheets are composed of such sea water-resistant thick films of polyvinyl chloride, polyvinylidene chloride, polyethylene, polypropylene or woven cloth of monofilaments made from any one of the said synthetic resins and wrapped around the rubber hose at a width desired according to the diameter of the said rubber hose to cover the entire surface of the hose before it is put in service, and then the wrapped rubber hose is put in service in sea water. When the settling of shellfishes or crustaceans on the wrapping sheet surface of the rubber hose becomes so thick that the rubber hose can hardly bear the weight of clustering sea life, the wrapping sheet is cut off and taken off in sea water. Such a job is simpler than conventional one and thus can be effected in a shorter period of time with less labor.

It is desirable that the thus removed sea life, such as shellfishes and crustaceans, are collected in such a state as they are on the strip sheet, to be disposed of on land. The rubber hose denuded of the strip sheet must be without any loss of time wrapped anew with another strip sheet as it is in sea water or after it is taken out of sea water.

What is claimed is:

1. A method for utilizing rubber hoses as oil conduits in a sea water environment between an oil tanker and a mooring buoy which comprises:
   a. wrapping said rubber hoses with strips that are resistant to sea water before said rubber hoses are immersed in sea water,
   b. immersing the thus wrapped rubber hoses in sea water,
   c. leaving said wrapped rubber hoses in the sea water until the weight of adhering sea life becomes unacceptably heavy,
   d. removing the said wrapped strip with its adhering sea life from the rubber hoses, and
   e. repeating steps (a) through (d) in sequence any desired number of times.

* * * * *